United States Patent [19]

Walker

[11] 3,879,298

[45] Apr. 22, 1975

[54] CONTROLLING SALT CONTAMINATED DRILLING FLUIDS WITH ETHYLENE DICARBOXYLIC ACID

[75] Inventor: Thad O. Walker, Houston, Tex.

[73] Assignee: Texaco Inc., New York, N.Y.

[22] Filed: Jan. 2, 1973

[21] Appl. No.: 320,032

[52] U.S. Cl.......... 252/8.5 C; 252/8.5 R; 252/8.5 A
[51] Int. Cl............................................. E21b 21/04
[58] Field of Search............ 252/8.5 R, 8.5 A, 8.5 C

[56] References Cited
UNITED STATES PATENTS

| | | | |
|---|---|---|---|
| 2,911,366 | 11/1959 | Hedrick et al. | 252/8.5 A |
| 2,948,678 | 8/1960 | Turner et al. | 252/8.5 A |
| 3,070,543 | 12/1962 | Scott | 252/8.5 A |
| 3,070,544 | 12/1962 | Johnson et al. | 252/8.5 A |
| 3,216,934 | 11/1965 | Reinhard | 252/8.5 A |
| 3,222,278 | 12/1965 | Harryman et al. | 252/8.5 A |
| 3,654,164 | 4/1972 | Sperry | 252/8.5 A |

*Primary Examiner*—Benjamin R. Padgett
*Assistant Examiner*—B. Hunt
*Attorney, Agent, or Firm*—Thomas H. Whaley; Carl G. Ries

[57] ABSTRACT

Method of controlling the rheology of a fresh water drilling fluid contaminated with salt by incorporating therein an ethylenedicarboxylic acid in an amount of from about 0.5 to about 6 pounds per after being applied to a soiled substrate. Soil adheres to the tacky film which, as a method employing such a contaminated drilling fluid and containing said ethylenedicarboxylic acid, and a drilling fluid additive consisting of said ethylenedicarboxylic acid.

10 Claims, No Drawings

CONTROLLING SALT CONTAMINATED DRILLING FLUIDS WITH ETHYLENE DICARBOXYLIC ACID

This invention relates to a fresh water drilling fluid for drilling wells through subsurface formations by means of well drilling tools, and particularly to a drilling fluid that has been contaminated with salt in the formation, with the result that its physical properties have been substantially impaired. The invention is also concerned with a method of drilling wells employing the fresh water drilling fluid as well as an additive for the contaminated drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in the event of shutdowns in drilling.

An ideal drilling fluid is a thixotropic colloidal system, i.e., a fluid which on agitation or circulation (as by pumping or otherwise) has a measurable relatively low viscosity and is free-flowing (not plastic), particularly at high temperatures, but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable fresh water drilling fluids having satisfactory dispersibility, and the necessary thixotropic properties discussed above, when substantial amounts of salt are met in the formation during drilling operations. In such instances the drilling fluid properties are materially changes and the drilling operation is interrupted to meet this situation.

One known method to control the resulting adverse properties of the drilling fluid contaminated with salt is to thin the mud by water dilution. This method is disadvantageous particularly with a weighted mud system since water dilution results in high maintenance costs. Another remedy found to be advantageous is to convert the fresh water mud to a saturated salt water mud system. However, such conversion brings with it attendant disadvantages such as closer control of the new mud system.

It has now been found that the rheology of a fresh water drilling fluid contaminated with salt can be readily controlled by the addition of a minor amount of an ethylenedicarboxylic acid, the corresponding acid anhydride or mixtures, thereof, in the range of from about 0.5 to about 6 pounds per barrel of drilling fluid. A suitable ehtylenedicarboxylic acid is maleic acid as well as the anhydride thereof, maleic anhydride, and the isomer fumaric acid.

The fresh water drilling fluid of the present invention contains water, a dispersed hydratable drilling clay therein, a dispersing agent for sand clayey material and the prescribed amount of the ethylenedicarboxylic acid.

Any suitable clay dispersing agent may be employed in the preparation of a drilling fluid or a drilling mud reagent or additive admixture in accordance with the practice of this invention, provided, of course, it is compatible with its environment in the additive admixture and/or in the drilling mud, i.e., it is not salted out and does not undergo a chemical reaction or a physical or chemical change which would render it unsuitable or useless as a dispersing agent therein. Clay dispersing or thinning agents suitable in the practice of the invention include the lignosulfonates, such as the alkali metal lignosulfonates, the alkaline earth metal lignosulfonates and the heavy metal-containing lignosulfonates, e.g., a lignosulfonate containing both iron and chromium. A suitable heavy metal-containgin lignosulfonate is Q-Broxin, a ferro-chrome lignosulfonate manufactured by the Puget Sound Pulp & Paper Company of Bellingham, Washington. Other heavy metal-containing lignosulfonate such as iron lignosulfonate, chrome lignosulfonate, nickel lignosulfonate, lead lignosulfonate, copper lignosulfonate, manganese lignosulfonate, molybdenum lignosulfonate, ferro-chrome lignosulfonate or mixtures and complexes thereof are also suitable clay dispersing agents.

The drilling fluids may also include the usual water loss additives such as a prehydrolyzed starch commercially available under the tradenames Imerpmex and My-lo-gel, carboxymethycellulose (CMC) and the like.

The ethylenedicarboxylic acid used in the fresh water drilling fluid to restore the drilling fluid properties thereto after the drilling fluid is contaminated with a salt such as sodium or potassium chloride, is maleic acid, maleic anydride, fumaric acid and mixtures thereof in an amount of from about 0.5 to about 6 pounds per barrel. Most effective results are obtained using amounts in the range of from about 1 to about 4 pounds per barrel, especially when maleic acid or a mixture of maleic acid and maleic acid anhydride are used.

The drilling fluid additive for use in the practice of the present invention may comprise maleic acid, maleic acid anhydride, fumaric acid, including mixtures thereof is incorporated in the drilling fluid in an amount in the range of from about 0.5 to about 6 pounds per barrel.

In the accompanying table the properties of the fresh water drilling fluid were determined in accordance with the established procedure set forth in the American Petroleum Institute publication, API RP-29, Fourth Edition. Yield Point (YP) is calculated by subtracting the Plastic Viscosity (PV) from the Fann Viscosity reading at 300 rpm. Plastic Viscosity (PV) is obtained by calculation, subtracting the Fann Viscosity reading at 300 rpm from the 600 rpm reading. Apparent Viscosity (AV) is equal to one-half of the Fann Viscosity (FV)

reading obtained at 600 rpm. The fluidity of a drilling fluid can be back calculated from these data, the results being expressed in Fann Viscosity at 600 rpm and 300 rpm, for a direct reading viscometer.

The table sets forth representative physical properties of the drilling fluid both before and after addition of the indicated materials thereto. In each example the amount of material or materials added to the drilling fluid is shown in terms of pounds per barrel of drilling fluid.

The base drilling fluid used in the tests was a top hole mud obtained from a drilling site in the West Cote Blanche Bay field. This base drilling mud is a lightly treated top hole mud containing native solids. By "lightly treated" is meant that caustic has been added to adjust the pH to about 9.0 and bentonite added to increase the viscosity. There is incorporated in the top hole mud the ferrochrome lignosulfonate dispersant known by the trade name "Q-Broxin", the pH adjusted to 9.5–10, then the mud was aged at 150°F for 16 hours.

In the above table, after the addition of the maleic acid to the salt contaminated drilling fluid, each of the Examples 1–17 inclusive, was aged overnight at 150°F to condition the samples.

The base mud and the salt contaminated base muds of Examples A-D inclusive were treated with sufficient aqueous caustic to adjust the pH readings to 9.6. The pH of the muds containing maleic acid were treated with aqueous caustic to obtain a pH of 7.4–7.8.

The data in the table show that the drilling fluid properties of the salt contaminated mud are substantially improved by the addition of varying amounts of maleic acid thereto. The beneficial effects are also evident over a relatively wide range of salt concentrations. With respect to the data in Example 17, it is to be noted that it was obtained using a different base mud system than the one used in the other examples. The base mud in this example was a top hole mud treated with 6 pounds per barrel of "Q-Broxin," the pH adjusted to 9.5–10, and aged for 16 hours at 150°F. Obviously many modifications and variations of the invention as hereinbefore set forth may be made without departing from the spirit and scope thereof, and therefore only such limitations should be made as are indicated in the appended claims.

TABLE

| Example | Amount of Additive lbs/barrel | PV cpe. | YP lbs/100 ft.$^2$ | ApVis cpe. | pH | Cl. ppm. |
|---|---|---|---|---|---|---|
| | Base Mud | 28.5 | 0 | 28 | 9.6 | — |
| A. | Base Mud + 5 NaCl | 30 | 23 | 41.5 | 9.6 | 13,200 |
| 1. | "A" + 1 Maleic* | 30.5 | 14.5 | 32.8 | 7.8 | |
| 2. | "A" + 2 Maleic* | 30 | 19 | 39.5 | 7.5 | |
| 3. | "A" + 3 Maleic* | 25.5 | 19 | 35 | 7.4 | |
| 4. | "A" + 4 Maleic* | 19.5 | 21.5 | 30.3 | 7.6 | |
| B. | Base Mud + 10 NaCl | 24 | 53 | 50.5 | 9.6 | 22,350 |
| 5. | "B" + 1 Maleic* | 33 | 23 | 44.5 | 7.5 | |
| 6. | "B" + 2 Maleic* | 28 | 20.5 | 38.3 | 7.6 | |
| 7. | "B" + 3 Maleic* | 28.5 | 18.5 | 37.8 | 7.6 | |
| 8. | "B" + 4 Maleic* | 21.5 | 21.5 | 32.3 | 7.4 | |
| C. | Base Mud + 15 NaCl | 21 | 66 | 54 | 9.6 | 31,400 |
| 9. | "C" + 1 Maleic* | 26.5 | 25 | 39 | 7.6 | |
| 10. | "C" + 2 Maleic* | 32.5 | 16.5 | 40.8 | 7.7 | |
| 11. | "C" + 3 Maleic* | 30 | 15 | 37.5 | 7.4 | |
| 12. | "C" + 4 Maleic* | 19.5 | 21 | 30 | 7.6 | |
| D. | Base Mud + 20 NaCl | 20 | 67 | 53.5 | 9.6 | 49,350 |
| 13. | "D" + 1 Maleic* | 30.5 | 21 | 41 | 7.5 | |
| 14. | "D" + 2 Maleic* | 26 | 15 | 33.8 | 7.8 | |
| 15. | "D" + 3 Maleic* | 27 | 14 | 34 | 7.6 | |
| 16. | "D" + 4 Maleic* | 24 | 12 | 30 | 7.4 | |
| E. | Base Mud + 20 NaCl | 29.5 | 92 | 75.5 | 9.6 | |
| 17. | "E" + 4 Maleic Anhydride | 28.5 | 74 | 65.5 | 9.7 | |

* Maleic means maleic acid

I claim:

1. Method of controlling the rheology of a fresh water drilling fluid that has been contaminated with a salt selected from the group consisting of sodium chloride, potassium chloride and mixtures thereof, by adding to said salt contaminated drilling fluid a ethylenedicarboxylic acid selected from the group consisting of maleic acid, fumaric acid and maleic acid anhydride, in an amount of from about 0.5 to about 6 pounds per barrel of drilling fluid.

2. Method as claimed in claim 1 wherein said ethylenedicarboxylic acid is maleic acid.

3. Method as claimed in claim 1 wherein said ethylenedicarboxylic acid is maleic acid anhydride.

4. Method as claimed in claim 1 wherein said ethylenedicarboxylic acid is fumaric acid.

5. Method as claimed in claim 1 wherein said ethylenedicarboxylic acid is added in an amount of from about 1 to 4 pounds per barrel.

6. In a method of drilling wells where in the drilling fluid is passed through the well in contact with an earth formation during the drilling operation in contact with a salt selected from the group consisting of sodium chloride, potassium chloride and mixtures thereof in the formation, the improvement which comprises contacting said earth formation with a fresh water drilling fluid containing clay solids dispersed therein by a clay dispersing agent and containing from about 0.5 to about 6 pounds per barrel of drilling fluid of an ethylenedicarboxylic acid, said ethylenedicarboxylic acid being effective to restore the rheology of said drilling fluid in the presence of any contaminating amounts of salt in the formation, said ethylenedicarboxylic acid being selected from the group consisting of maleic acid, fumaric acid and maleic acid anhydride.

7. Method as claimed in claim 6 wherein said ethylenedicarboxylic acid is maleic acid.

8. Method as claimed in claim 6 wherein said ethylenedicarboxylic acid is the anhydride of maleic acid.

9. Method as claimed in claim 6 wherein said ethylenedicarboxylic acid is added in an amount of from about 1 to 4 pounds per barrel.

10. A drilling fluid additive to restore the mud properties of a fresh water drilling fluid that has been contaminated with a salt selected from the group consisting of sodium chloride, potassium chloride and mixtures thereof, which consists of a member selected from the group consisting of maleic acid, maleic anhydride, fumaric acid, and a mixture of maleic acid and maleic anhydride.

* * * * *

UNITED STATES PATENT AND TRADEMARK OFFICE
CERTIFICATE OF CORRECTION

PATENT NO. : 3,879,298
DATED : April 22, 1975
INVENTOR(S) : Thad O. Walker

It is certified that error appears in the above-identified patent and that said Letters Patent are hereby corrected as shown below:

In the Abstract on Page 1, beginning on line 4 and continuing to part of line 6 should read "....6 pounds per barrel, a drilling method....."

Signed and Sealed this sixth Day of January 1976

[SEAL]

Attest:

RUTH C. MASON
Attesting Officer

C. MARSHALL DANN
Commissioner of Patents and Trademarks